(12) United States Patent
Serebrin et al.

(10) Patent No.: US 10,846,228 B2
(45) Date of Patent: Nov. 24, 2020

(54) INSTRUCTION CACHE MANAGEMENT BASED ON TEMPORAL LOCALITY

(71) Applicant: Google LLC, Mountain View, CA (US)

(72) Inventors: Benjamin C. Serebrin, Sunnyvale, CA (US); Kim Hazelwood, Cupertino, CA (US)

(73) Assignee: Google LLC, Mountain View, CA (US)

( * ) Notice: Subject to any disclaimer, the term of this patent is extended or adjusted under 35 U.S.C. 154(b) by 12 days.

(21) Appl. No.: 16/252,018

(22) Filed: Jan. 18, 2019

(65) Prior Publication Data
US 2019/0155739 A1    May 23, 2019

Related U.S. Application Data

(63) Continuation of application No. 14/450,060, filed on Aug. 1, 2014, now abandoned.

(51) Int. Cl.
*G06F 12/08* (2016.01)
*G06F 12/0875* (2016.01)
(Continued)

(52) U.S. Cl.
CPC ........ *G06F 12/0875* (2013.01); *G06F 12/123* (2013.01); *G06F 12/126* (2013.01); *G06F 12/127* (2013.01)

(58) Field of Classification Search
CPC .. G06F 12/0875; G06F 12/123; G06F 12/126; G06F 12/127; G06F 9/30;
(Continued)

(56) References Cited

U.S. PATENT DOCUMENTS 6,223,256 B1    4/2001    Gaither
6,349,365 B1    2/2002    McBride
(Continued)

FOREIGN PATENT DOCUMENTS

EP    1149342    10/2001

OTHER PUBLICATIONS

S. Kumar and C. Wilkerson, "Exploiting spatial locality in data caches using spatial footprints," Proceedings. 25th Annual International Symposium on Computer Architecture (Cat. No. 98CB36235), Barcelona, Spain, 1998, pp. 357-368, doi: 10.1109/ISCA.1998.694794. (Year: 1998).*
(Continued)

*Primary Examiner* — Khoa D Doan
(74) *Attorney, Agent, or Firm* — Fish & Richardson P.C.

(57) ABSTRACT

The present disclosure relates to managing an instruction cache based on temporal locality of cached instructions. One example method includes receiving a request for a first instruction included in a software application; storing the first instruction in a cache structure; receiving a request for a second instruction included in the software application; determining that a cache entry must be removed from the cache structure to create space to store the second instruction; determining that the first instruction should be removed from the cache structure based on temporal locality attributes associated with at least one of the first instruction or the second instruction, the temporal locality attributes representing a likelihood that additional requests will be received for an associated instruction while the instruction is stored in the cache structure; removing the first instruction from the cache structure; and storing the second instruction in the cache structure.

20 Claims, 7 Drawing Sheets

(51) Int. Cl.
G06F 12/123 (2016.01)
G06F 12/126 (2016.01)
G06F 12/127 (2016.01)

(58) Field of Classification Search
CPC ............. G06F 9/30003; G06F 9/30058; G06F 9/30065; G06F 9/3842–3848
See application file for complete search history.

(56) References Cited

U.S. PATENT DOCUMENTS

| | | | |
|---|---|---|---|
| 7,272,704 B1* | 9/2007 | Nguyen | G06F 9/3802 712/241 |
| 2003/0005419 A1 | 1/2003 | Pieper | |
| 2003/0014741 A1 | 1/2003 | Megiddo | |
| 2005/0086436 A1* | 4/2005 | Modha | G06F 12/123 711/133 |
| 2007/0220201 A1 | 9/2007 | Gill | |
| 2008/0263281 A1 | 10/2008 | Kim et al. | |
| 2009/0031310 A1* | 1/2009 | Lev | G06F 9/466 718/101 |
| 2009/0113135 A1* | 4/2009 | Cain | G06F 12/126 711/135 |
| 2009/0138661 A1 | 5/2009 | Lauterbach | |
| 2013/0159679 A1 | 6/2013 | McCormick | |
| 2013/0185488 A1 | 7/2013 | Talagala | |
| 2013/0339616 A1* | 12/2013 | Alexander | G06F 12/084 711/130 |
| 2013/0339625 A1 | 12/2013 | Prasky | |
| 2013/0339796 A1* | 12/2013 | Greiner | G06F 9/30087 714/37 |
| 2014/0136792 A1 | 5/2014 | Frachtenberg | |
| 2015/0378779 A1* | 12/2015 | Busaba | G06F 12/0811 711/147 |

OTHER PUBLICATIONS

"Cache Design," University of California, San Diego, Class presentation, publically available before Aug. 1, 2014, retrieved from the Internet: URL<http://cseweb.ucsd.edu/classes/fa10/cse240a/pdf/08/CSE240A-MBT-L15-Cache.ppt.pdf>, 59 pages.

"Microprocessor Design/Cache," from Wikibooks, Aug. 9, 2013 [retrieved on Jul. 17, 2014]. Retrieved from the Internet: URL<https://en.wikibooks.org/wiki/Microprocessor_Design/Cache>, 8 pages.

EP Office Action issued in European Application No. 15179104.3, dated Oct. 15, 2018, 7 pages.

Extended European Search Report issued in European Application No. 15179104.3 dated Mar. 31, 2016, 11 pages.

Partial European Search Report issued in European Application No. 15179104.3 dated Dec. 4, 2015, 6 pages.

Sartor, J. B., Venkiteswaran, S., McKinley, K. S., & Wang, Z. (Feb. 2005). Cooperative caching with keep-me and evict-me. In 9th Annual Workshop on Interaction between Compilers and Computer Architectures (INTERACT'05) (pp. 46-57). IEEE.

EP Office Action issued in European Application No. 15179104.3, dated Mar. 13, 2019, 7 pages.

* cited by examiner

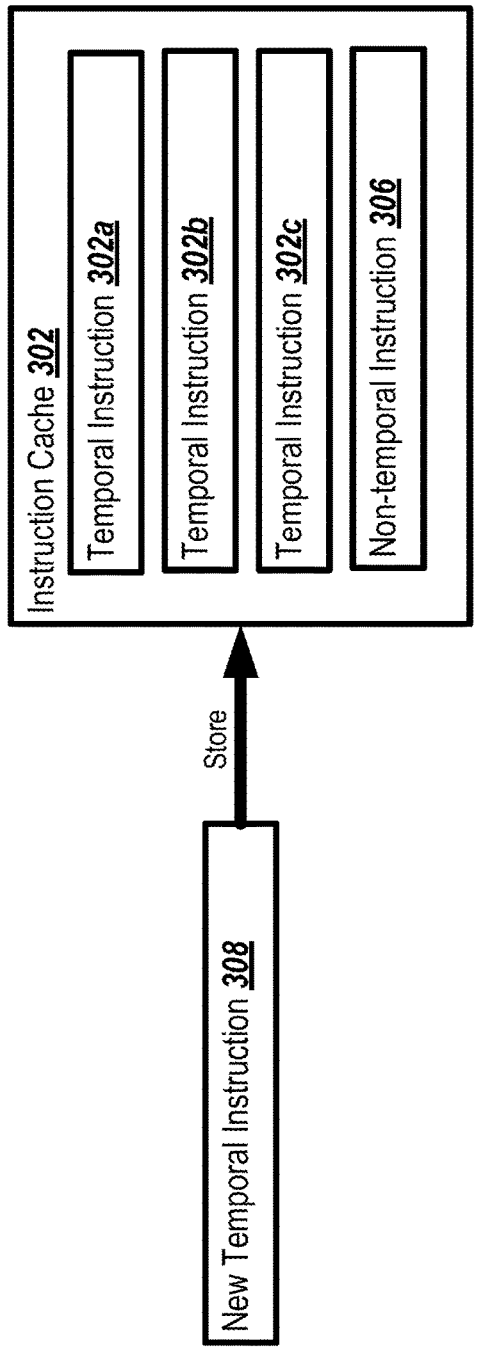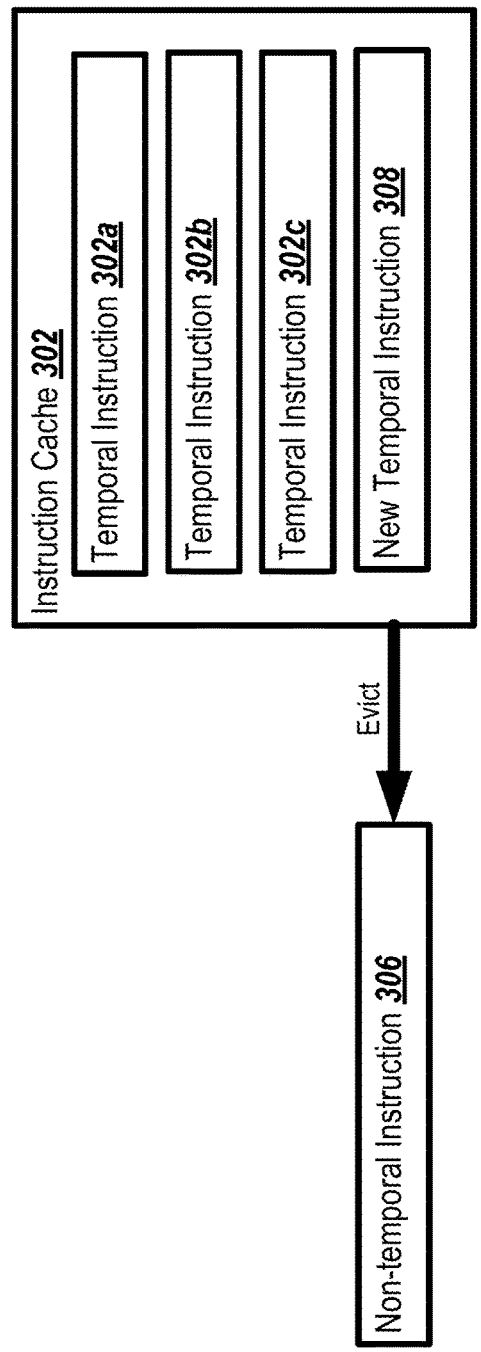
FIG. 3A
FIG. 3B

INSTRUCTION CACHE MANAGEMENT BASED ON TEMPORAL LOCALITY

CROSS-REFERENCE TO RELATED APPLICATIONS

This application is a continuation of U.S. application Ser. No. 14/450,060, filed Aug. 1, 2014, the contents of which are incorporated by reference herein.

BACKGROUND

In computing devices, a processor, such as a central processing unit (CPU), may process instructions included in software applications according to an execution cycle. One example instruction cycle includes a fetch stage, in which a next instruction to be executed is fetched from memory, a decode stage, in which the fetched instruction is interpreted and prepared for execution, and an execution stage, where the behavior associated with the instruction is performed. In some cases, the processor or the computing device containing the processor may include an instruction cache for storing instructions so that the processor will not have to fetch frequently used instructions from memory, such as Random Access Memory (RAM), every time the instructions are to be executed. Such an instruction cache may improve processor performance, as fetching an instruction from memory is a relatively slow operation that may take hundreds of processor cycles, while a fetch from a cache may only take a few processor cycles.

SUMMARY

The present disclosure relates to managing an instruction cache based on temporal locality of cached instructions.

In general, one innovative aspect of the subject matter described in this specification can be embodied in methods that include the actions of receiving a request for a first instruction included in a software application; storing a first cache entry corresponding to the first instruction in a cache structure; receiving a request for a second instruction included in the software application, the second instruction different than the first instruction; in response to receiving a request for the second instruction, determining that a cache entry must be removed from the cache structure to create space to store a second cache entry corresponding to the second instruction; in response to determining that a cache entry must be removed, determining that the first cache entry corresponding to the first instruction should be removed from the cache structure based on temporal locality attributes associated with at least one of the first instruction or the second instruction, the temporal locality attributes representing a likelihood that additional requests will be received for an associated instruction while the instruction is stored in a cache structure; in response to determining that the first cache entry corresponding to the first instruction should be removed, removing the first cache entry from the cache structure; and in response to removing the first cache entry, storing the second cache entry in the cache structure.

In another general aspect, an example method includes determining a first temporal locality indicator for a first instruction region of a software application and a second temporal locality indicator for a second instruction region of the software application different than the first instruction region, the first and second instruction regions each including one or more instructions, the first and second temporal locality indicators representing likelihoods that instructions included in the first and second instruction regions, respectively, will be re-executed while the instructions are stored in a cache structure, the second temporal locality indicator indicating that instructions in the second instruction region are more likely to be re-executed than instructions in the first instruction region; and providing the first temporal locality indicator and the second temporal locality indicator to the cache structure, wherein the cache structure is configured to store cache entries representing instructions of the software application as the instructions are executed by a processor executing the software application, and wherein the cache structure is configured to remove a first cache entry representing an instruction included in the first instruction region to create space to store a second cache entry representing an instruction included in the second instruction region based at least in part on the first temporal locality indicator and the second temporal locality indicator.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By managing which instructions are stored in an instruction cache such that more likely to be frequently used (or "temporal") instructions are given precedence over instructions that are less likely to be frequently used (or "non-temporal") instructions, the hit rate of the instruction cache may be increased, which may lead to improved system performance. Further, the techniques described herein may be used to profile a particular software application and determine temporal locality attributes associated with various instructions and/or instruction regions of the particular software application. The temporal locality attributes may then be used to modify instruction cache behavior to the particular software application, which may lead to further performance improvements over previous cache management schemes, such as least recently used (LRU) schemes.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 3A is a block diagram showing an example state of an instruction cache before an eviction decision based on temporal locality.

FIG. 3B is a block diagram showing an example state of an instruction cache after an eviction decision based on temporal locality.

Like reference numbers and designations in the various drawings indicate like elements.

DETAILED DESCRIPTION

Figure 1:
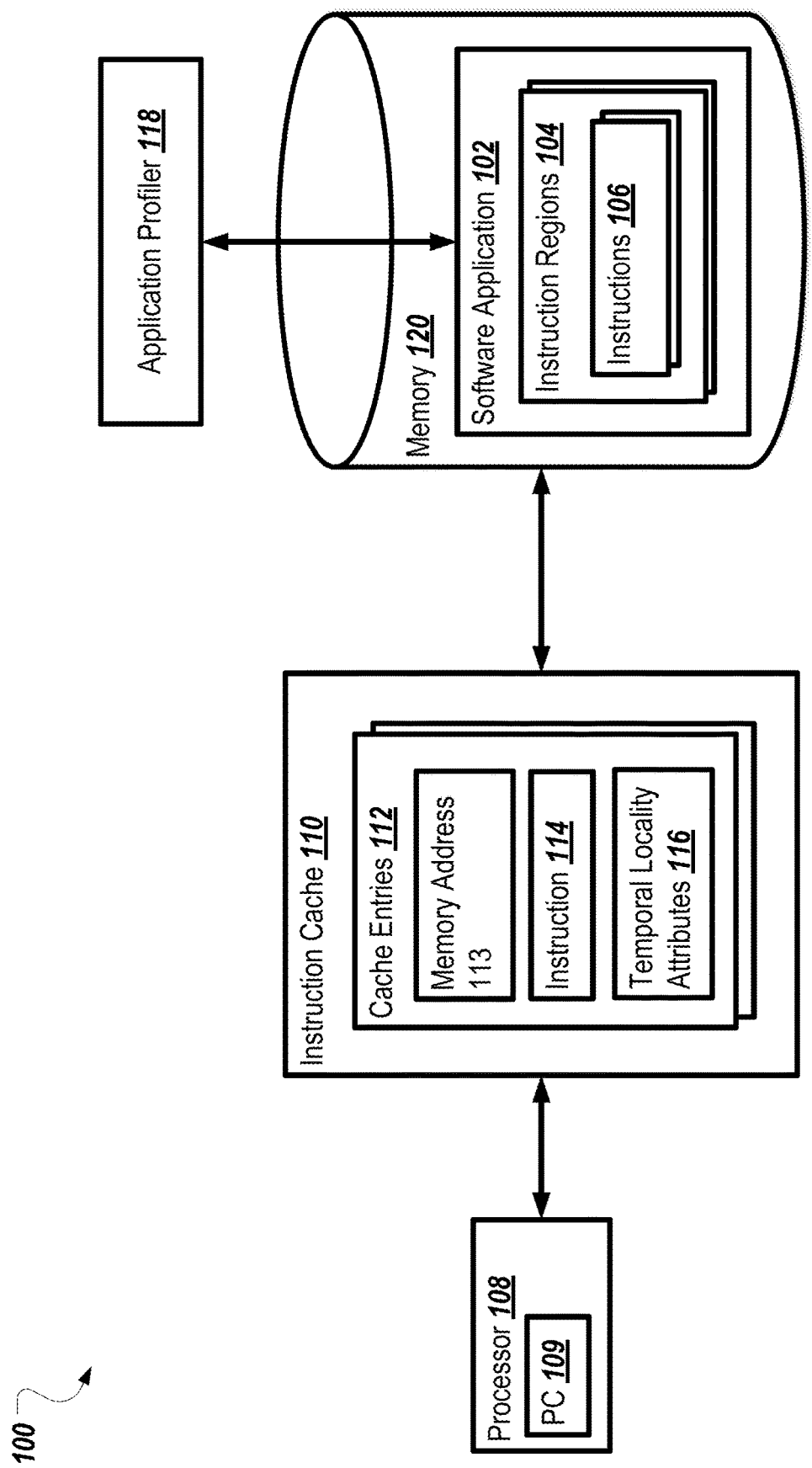
FIG. 1 is a block diagram of an environment in which instruction cache management based on temporal locality can occur.

Some software applications may include a large number of different instructions to be executed by a processor. Such applications may be referred to as having "large instruction footprints." Such applications may include a large "working set" of instructions; that is, a large set of instructions that are executed fairly often. These instructions are often stored in the cache and evicted from the cache during processing. A characteristic of an instruction that is determined by the system and methods described below is "temporal locality," which is a representation of the likelihood of an instruction being executed while the instruction is stored in the cache. Temporal locality can be quantified in a binary manner, e.g., either temporal or non-temporal, or in a more granular manner over a particular range. In the case of the latter, for example, instructions may have low, moderate and high temporal locality, where a subset of instructions that have high temporal locality are executed more often than those with moderate or low temporal locality.

In some cases, an instruction cache may be inefficiently utilized because instructions with high temporal locality may be evicted from the instruction cache's limited space to make room for instructions with lower temporal locality. The lower temporal locality instructions may not be re-executed while they are resident in the instruction cache, which may lead to decreased performance as more instructions will be fetched from memory than from the instruction cache. When an application has a large instruction footprint or large working set of instructions, this situation may occur frequently as a larger number of different instructions are likely to be executed in between consecutive executions of a particular instruction. This may lead to an instruction cache that does not store the most frequently used instructions for the application.

Accordingly, the present disclosure describes techniques for managing an instruction cache based on temporal locality of cached instructions. One example technique includes receiving a request for a first instruction included in a software application. For example, the request may be received by a cache structure from a processor executing the software application. The cache structure may then store a first cache entry corresponding to the first instruction, such as, for example, after fetching the instruction from a memory. The cache structure may receive a request for a second instruction included in the software application and different than the first instruction. In response to receiving a request for the second instruction, the cache structure may determine that a cache entry must be removed from the cache structure to create space to store a second cache entry corresponding to the second instruction, such as, for example, in cases where the cache structure is full. In response to determining that a cache entry must be removed, the cache structure may determine that the first cache entry corresponding to the first instruction should be removed from the cache structure based on temporal locality attributes associated with at least one of the first instruction or the second instruction and representing a likelihood that additional requests will be received for an associated instruction. For example, the first and second cache entries may include the temporal locality attributes and the cache structure may analyze the attributes to determine that the first cache entry should be removed, such as, for example, in the case that the attributes indicate that the first instruction is less likely to be re-executed than the second instruction. In response to determining that the first cache entry corresponding to the first instruction should be removed, the cache structure may remove the first cache entry and store the second cache entry.

Another example technique includes determining a first temporal locality indicator for a first instruction region of a software application and a second temporal indicator attribute for a second instruction region of the software application different than the first instruction region. In some cases, the temporal locality indicators may be determined by an application profiler. The first and second temporal locality indicators may represent likelihoods that instructions included in the first and second instruction regions, respectively, will be re-executed while the instructions are stored in a cache structure. In one example, the second temporal locality indicator indicates that instructions in the second instruction region are more likely to be re-executed than instructions in the first instruction region while in the cache. The application profiler may provide the first temporal locality indicator and the second temporal locality indicator to the cache structure, which may remove a first cache entry representing an instruction included in the first instruction region to create space to store a second cache entry representing an instruction included in the second instruction region based at least in part of the first temporal locality indicator and the second temporal locality indicator.

These features and additional features are described in more detail below.

FIG. 1 is a block diagram of an environment 100 in which instruction cache management based on temporal locality can occur. As shown, the environment 100 includes a processor 108, an instruction cache 110, a memory 120, and an application profiler 118. In operation, the application profiler 118 analyzes a software application 102 to determine temporal locality attributes 116 associated with instruction regions 104 or instructions 106 of the software application 102. The temporal locality attributes 116 may be inserted into the software application 102, such as in the form of indicators, marks, or directives within the instruction regions 104 and/or the instructions 106. The temporal locality attributes 116 may also be stored separately from the software application 102, such as in another part of memory 120.

When the software application 102 is executed by the processor 108, the processor 108 fetches instructions 106 to execute via the instruction cache 110. The instruction cache 110 stores one or more cache entries 112 each representing a particular instruction 114 and including temporal locality attributes 116 associated with the instruction 114. When the processor 108 fetches an instruction from the instruction cache 110, the instruction cache 110 determines whether the requested instruction is stored in one of the cache entries 112. If the instruction cache 110 determines that the requested instruction is not included in one of the cache entries 112, the instruction cache 110 fetches the requested instruction from the memory 120. In some cases, the instruction cache 110 may fetch a block of data from memory that includes the requested instruction and other instructions occurring before or after the requested instruction in memory. The instruction cache 110 may also fetch the temporal locality attributes 116 associated with the requested instruction, and may store the temporal locality attributes 116 in the cache entry 112 along with the instruction 114. In some cases, the instruction cache 110 may determine that all cache entries 112 currently being used to store instructions (i.e., the cache is full), and may determine whether to remove (e.g., evict) an instruction from one of the cache entries 112 to make room for the requested instruction. The instruction cache 110 may make this determination based on the temporal locality attributes 116 associated with the requested instruction, and with each of the instructions 114 stored in the cache entries 112. For example, if the processor 108 requests an instruction 106 from the instruction cache 110 and the instruction cache 110 does not have a cache entry 112 associated with the instruction 106 and the instruction cache 110 is full, the instruction cache 110 may determine whether to evict an instruction from one of the cache entries 112 to store the instruction 106, or whether to return the requested instruction 106 to the processor 108 without storing the instruction 106 in a cache entry 112. This determination may be made according to the temporal locality attributes 116 associated with the instruction 106, and according to the temporal locality attributes 116 associated with the instructions 114 stored in the cache entries 112 of the instruction cache 110.

In the current example, assume that the temporal locality attributes 116 for the instruction 106 indicate that the instruction 106 is temporal (e.g., likely to be re-fetched by the processor while stored in the cache), and that the temporal locality attributes 116 for the instruction 114 indicate that the instruction 114 is non-temporal (e.g., not likely to be re-fetched by the processor while stored in the cache relative to a temporal instruction). The instruction cache 110 may evict the instruction 114, which is non-temporal, in order to store instruction 106, which is temporal.

In some cases, the instruction cache 110 may store a non-temporal instruction in a least recently used (LRU) position within the cache such that it is likely to be evicted. Such behavior may allow a performance increase for non-temporal instructions that happen to be accessed multiple times in rapid succession, such as part of a loop, but then are not accessed while they would still be stored in the cache structure 110.

The environment 100 includes a processor 108. Although illustrated as a single processor 134 in FIG. 1, two or more processors may be included in particular implementations of environment 100. Each processor 108 may be a central processing unit (CPU), a blade, an application specific integrated circuit (ASIC), a field-programmable gate array (FPGA), or another suitable component. (Insert boilerplate). The processor 108 may also be a single processor core of a larger processor including multiple integrated processor cores.

The processor 108 includes a program counter 109 that contains the memory address of the next instruction to fetch. In some cases, the program counter 109 may be initially populated with the address of the first instruction in the software application 102. As instructions are executed, the program counter 109 is updated. For example, the program counter 109 may be increased sequentially as the program executes, and may be updated to refer a different location in memory when a branch or other flow control instruction (such as a loop or a conditional) is encountered in the software application 102. In some cases, the program counter 109 may be a register or other structure included in the processor 108.

The environment 100 also includes an instruction cache 110. In some cases, the instruction cache 110 may be integrated with the processor 108, such as, for example, in the form of L1, L2, or L3 on-chip cache. The instruction cache 110 may also be a separate component from the processor 108, and may be utilized by multiple processors. In some implementations, the instruction cache 110 may be a specialized cache structure designed specifically to cache instructions fetched by the processor 108 so that the instructions do not have to be fetched from memory 120. The instruction cache 110 may also be a general-purpose cache structure. In some cases, the instruction cache 110 may include a predetermined number of cache entries 112, such that the instruction cache 110 has capacity to store a limited number of instructions 114 and associated temporal locality attributes 116.

In some implementations, the cache entries 112 may be storage locations within the instruction cache 110, each configured to store a memory address 113, an instruction 114, and a set of temporal locality attributes 116 associated with the instruction 114. In some cases, the instruction cache 110 may be indexed by the memory address 113 associated with each instruction 114. In operation, as the processor 108 executes the software application 102, it fetches its next instruction to execute by fetching from a memory address stored in a particular register, may be referred to as the "program counter" or "instruction pointer." The instruction cache 110 may find a cache entry 112 associated with the memory address 113 fetched by the processor 108, and return the instruction 114 stored in the cache entry 112 to the processor 108. In some implementations, the cache entries 112 may be cache lines within the instruction cache 110. The each cache entry 112 may also store multiple instructions, such as, for example, as part of a data block loaded from the memory 120.

As shown, each cache entry 112 includes a memory address 113. The memory address 113 may be an address within the memory 120 at which the instruction 114 is stored. The memory address 113 may also be an address within the memory 120 corresponding to the start of a data block stored by the cache entry 112, the data block containing the instruction 114. In some cases, the memory address 113 may be an integer value uniquely identifying location within the memory 120, such as a 32 bit integer or a 64-bit integer. The memory address 113 may also be a virtual memory address, such that it refers to location within a page of virtual memory rather than to a location within physical memory. In such a case, the memory address 113 may be translated to a physical address by consulting a page table (not shown).

The instruction cache 110, when it receives a request to fetch an instruction from the processor 108, may compare a memory address received from the processor 108 in the request to the memory address 113 in each of the cache entries 112. If the memory address 113 matches the requested memory address, the instruction cache 110 may return the instruction 114 to the processor 108. In some cases, the instruction cache 110 may inspect memory addresses 113 of multiple cache entries 112 simultaneously, such as, for example, through set associative or fully associative lookups.

Each cache entry 112 also includes an instruction 114. The instruction 114 may include information needed by the processor 108 to execute the portion of the software application 102 denoted by the address stored in the program counter 109. For example, an instruction 114 may include an opcode representing the instruction to execute, and arguments to use when executing the instruction, such as memory addresses or numerical values.

Each cache entry 112 may also include temporal locality attributes 116. The temporal locality attributes 116 may include information about the temporal locality of the instruction 114. In some cases, the temporal locality attributes 116 may include a bit indicating that the instruction 114 is temporal, and thus likely to be re-fetched by the processor 108 while in the cache, or that the instruction 114 is non-temporal, and thus not likely to be re-fetched by the processor 108 while in the cache. For example, an instruction may be marked as temporal if its likelihood of being re-fetched while in the cache is greater than a threshold likelihood, and marked as non-temporal if its likelihood of being re-fetched while in the cache is not greater than the threshold likelihood.

The temporal locality attributes 116 may also include values indicating how likely the instruction 114 is to be re-fetched by the processor 108, such as a numerical value representing this likelihood. In some cases, the temporal locality attributes 116 may include a usage count associated with the instruction 114. The usage count may be incremented by the instruction cache 110 each time the instruction 114 is re-fetched by the processor 108. In some cases, the temporal locality attributes 116 may be associated with the data block including the instruction 114 and stored in the cache entry 112.

The instruction cache 110 may use the temporal locality attributes 116 associated with each instruction 114 to determine if storing the instruction 114 in the instruction cache 110 will improve performance of the processor 108, or if the instruction 114 should be evicted from the cache in favor of a different instruction that is more likely to be re-fetched by the processor 108. For example, if the instruction cache 110 is full and the processor 108 fetches an instruction, the instruction cache 110 may identify the instruction 114 that is least likely to be re-fetched by the processor 108 based on the temporal locality attributes 116. If the requested instruction is more likely to be re-fetched by the processor 108 than the instruction 114, based on the temporal locality attributes 116, the instruction cache 110 may evict the instruction 114 and store the requested instruction. The instruction cache 110 may determine which instruction is more likely to be re-fetched by comparing temporal locality attributes 116 associated with each instruction. For example, the instruction cache 110 may determine that an instruction 114 with a low usage count should be evicted in favor of an instruction 114 with a higher usage count.

As shown, the environment 100 includes a memory 120. The memory 120 may include any type of memory and may take the form of volatile and/or non-volatile memory including, without limitation, magnetic media, optical media, random access memory (RAM), read-only memory (ROM), removable media, flash memory, or any other local or remote memory component. The memory 120 includes a software application 102. In some implementations, the software application 102 may be an executable program has been compiled from higher-level programming language, such as, for example, JAVA, C, C++, or other programming languages. Software application 102 may also be running inside an interpreter or other virtual environment, such as a virtual machine. The software application 102 may include one or more instruction regions 104. The instruction regions 104 contain one or more instructions 106. The instruction regions 104 may be denoted by boundaries, such as a starting and ending memory address, a starting and ending line number within a source code file, a function of procedure name, a filename, or other boundaries. Each of the one or more instructions 106 may be a machine language instruction executable by the processor 108. The instructions 106 may be formatted according to a particular instruction format associated with the processor 108.

The environment 100 also includes an application profiler 118. In operation, the application profiler 118 analyzes the software application 102 to produce the temporal locality attributes 116. In some implementations, the application profiler 118 may observe the execution behavior of the software application 102 in order to determine which instruction regions 104 and/or instructions 106 are likely to be re-fetched by the processor 108 during execution while the instruction regions 104 and/or instructions 106 are still stored in the instruction cache 110. For example, the application profiler 118 may track the number of processor cycles between consecutive executions of a particular instruction 106, and predict whether the particular instruction 106 would still have been stored in the instruction cache 110 when it was re-executed. In some cases, the application profiler 118 may execute the software application 102 and monitor or emulate its cache behavior to determine whether the particular instruction 106 would still have been stored in the instruction cache 110. The application profiler 118 may also monitor the software application 102 while it is executing and observe which instruction regions 104 and instructions 106 are re-executed while still stored in the instruction cache 110 to determine temporal locality. The application profiler 118 may also analyze historical execution data for the software application 102, such as logs or other data, to determine which instruction regions 104 and instructions 106 are re-executed while still stored in the instruction cache 110.

The application profiler 118 may insert profiling instructions into the software application 102 to collect data about its execution behavior. For example, the application profiler 118 may modify a particular instruction 106 so that a profiling instruction is executed each time the instruction 106 is executed. The application profiler 118 may analyze this data to determine the likelihood that the instruction 106 will be re-fetched while it is still stored in the instruction cache 110, and may produce temporal locality attributes 116 associated with the instruction 106 to reflect this likelihood.

In some implementations, the application profiler 118 may examine the source code of the application 102 prior to compilation and execution of the software application 102. For example, the application profiler 118 may mark particular instruction regions 104 as temporal, such as by inserting indications into the source code of the software application 102 at the beginning and end of the particular region 104 to be marked. A compiler may then translate these indications into directives to inform the instruction cache 110 that the particular instruction region 104 is temporal.

In some cases, the application profiler 118 may insert instructions to explicitly evict particular instructions from the instruction cache 110 at the end of the instruction region 104. For example, if a non-temporal instruction is accessed only as part of a loop within a particular function, the application profiler 118 may insert instruction to flush specific cache entries corresponding to the loop from the instruction cache 110 at the end of the particular function. The application profiler 118 may also insert directives to cause instructions to be inserted into different levels of cache based on temporal locality.

The particular techniques used for marking instruction regions as temporal or non-temporal may depend on details of the particular implementation of the instruction cache 110. For example, a cache entry could bypass the instruction cache 110 entirely and be inserted directly into an instruction fetch buffer associated with the processor 108. Alternately, the cache entry may be inserted into an eviction policy of the instruction cache 110 as least recently used (LRU) so that it will be evicted from the instruction cache 110 before any other line in the same set. It should be noted that even a non-temporal line may be in a short term loop, so the line's presence in the LRU position of the instruction cache 110 will cover the loop's short term temporal qualities while indicating that the line does not need to be in the cache once the loop is completed.

In some implementations, the application profiler 118 may mark non-temporal instruction regions by inserting explicit region start and end instructions. For example, a StartNonTemporal instruction inserted at the start of a function or basic block may indicate that all subsequent instructions are non-temporal. An EndNonTemporal instruction may indicate that subsequent instructions are now subject to normal caching policy. Similar instructions may be used to mark regions as temporal, or as sharing particular temporal locality attributes. To enable nesting of function calls, the start and end instructions may increment and decrement an internal counter. For example, if the counter is nonzero then the processor 108 may treat all incoming cache entries as non-temporal. In some cases, the internal counter may be context switched via XSAVE instructions, as each nesting count may be process-specific.

In some cases, the application profiler 118 may insert instructions to explicitly evict cache entries at the end of a basic block or function, such as by inserting a CLFLUSH instruction. Further, if the application profiler 118 determinates that a lower level of cache such as L1 is an appropriate target for a non-temporal line, a PREFETCHLn instructions can be used to put the instruction lines in the appropriate level of cache.

In some implementations, the application profiler 118 may mark an entire memory page as non-temporal or temporal, such as by using an unused or reserved bit in the page table entry for that page. In some cases, this bit could be a newly-allocated bit of the page table entry. A new semantic could also be used such that, in an x86 context, when a page is marked as executable, the page is always considered read-only, and the existing writeable-bit is redefined as a temporal indicator.

The application profiler 118 may create multiple aliases of particular instruction regions such that one alias is called when the instruction region is considered temporal, and another is called when the instruction region is considered not temporal. In some cases, the application profiler 118 may maintain a sideband bit vector outside the instruction cache 110. Each bit in the bit vector may represent the temporal status of a particular cache entry in the instruction cache 110.

In some implementations, the application profiler 118 may insert an instruction prefix on each instruction indicating its predicted next reuse. In an x86 architecture, many instruction prefixes have no effect (e.g., most segments). These prefixes can be used to mark each instruction as temporal or non-temporal. In some cases, each prefix may be coarse-grained (e.g. very far, medium, near) to indicate a relative temporal locality of the instruction to other levels of the cache hierarchy for use in partitioning. The prefix can also be a fine-grained indictor, such as a counter showing the number of instruction cycles since the last use of the instruction.

In some implementations, during execution, the application profiler 118 may mark an entire memory page as non-temporal if it contains only non-temporal instructions. In some cases, this may be achieved by updating an attribute of the memory page. The application profiler 118 may also mark instructions 106 within the software application 102 with a prefix indicating the instruction's 106 predicted next use.

In some cases, the application profiler 118 may utilize micro-architectural predictors (e.g., branch predictors) in determining temporal locality for particular instructions or instruction regions. Branch predictors are components that attempt to predict the outcome of conditional jump instructions (e.g., "if/else" statements) in order to continue fetching and executing instructions rather than waiting for the conditional jump instruction to be executed. For example, a branch predictor may identify a conditional checking whether the value of a particular variable is greater than 5. Based on one or more factors (discussed below) the branch predictor may predict whether the condition will evaluate to true (leading to the branch specified by the conditional being taken) or false (leading to the branch not being taken). Instructions from the predicted branch may be fetched and speculatively executed. If the conditional instruction finishes executing and the prediction was correct, execution continues down the speculative branch. If the conditional instruction finishes executing and the prediction was not correct, the speculatively executed instructions are discarded, and execution continues down the correct branch. In some cases, a branch predictor may specify a confidence associated with each prediction. This confidence may include discrete values (e.g., "branch strongly taken," "branch weakly taken," "branch strongly not taken," "branch weakly not taken") or a numeric value indicating a confidence level.

In some implementations, the application profiler 118 may use the predictions generated by branch predictors to determine temporal locality for particular instructions or instruction regions. In some cases, the application profiler 118 may treat each prediction as an indication of the temporal locality of a particular branch. For example, if a branch predictor predicts that a particular branch will be taken, the application profiler 118 may mark the cache entry associated with the particular branch as temporal. If a branch predictor predicts that a particular branch will not be taken, the application profiler 118 may mark the cache entry associated with the particular branch as non-temporal. In some cases, the application profiler 118 may take a confidence level associated with each prediction into account when determining temporal locality, such as by marking cache entries associated with branches predicted with a "strongly taken" confidence as temporal. The application profiler 118 may also use the determined correctness of a particular prediction as an indication of temporal locality. For example, if the branch predictor predicts that a particular branch will be taken and in fact the other branch is taken, the application profiler 118 may mark the cache entry associated with the mis-predicted branch as non-temporal.

Figure 2:
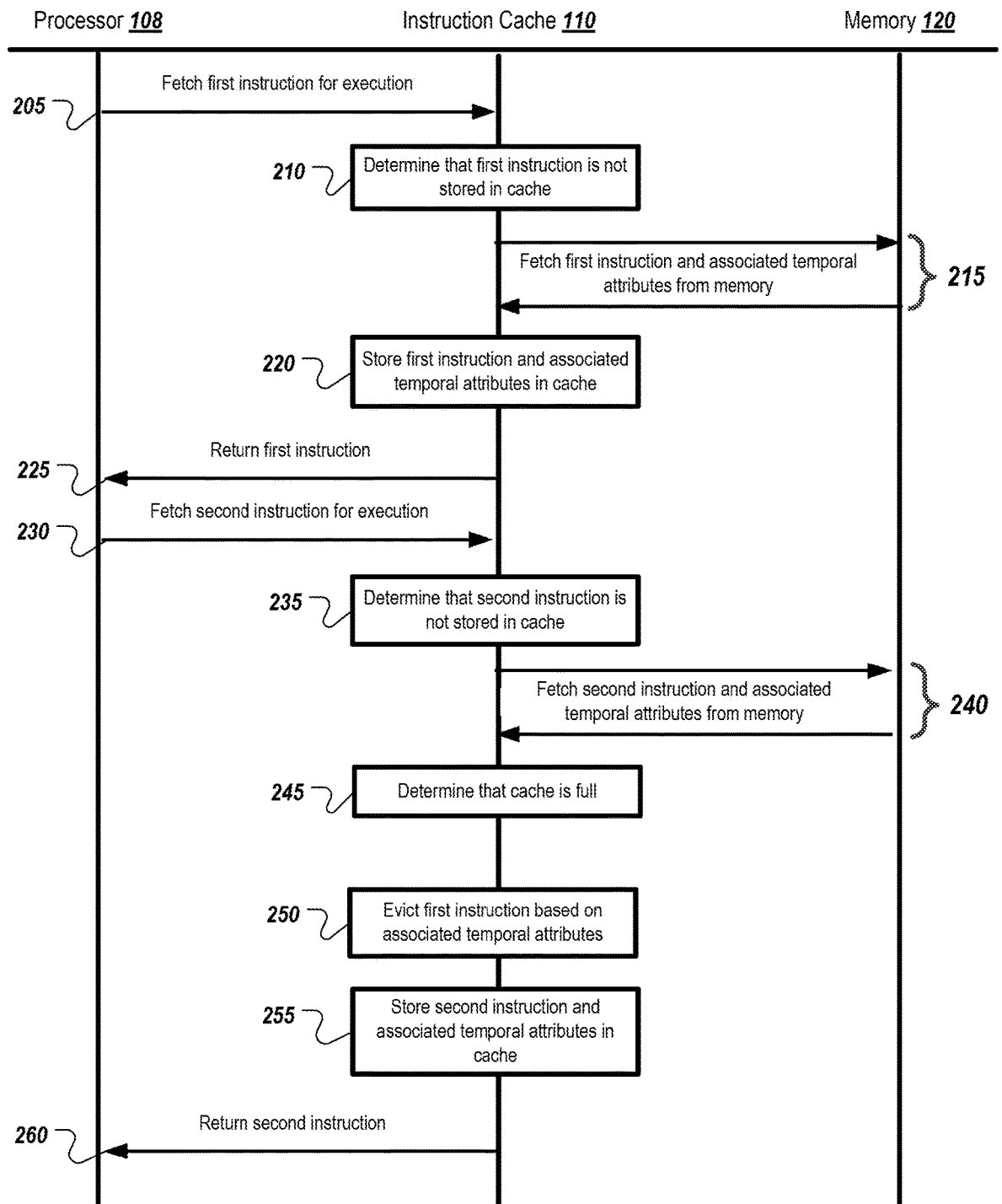
FIG. 2 is a block diagram of a system configuration showing information flow between a processor, an instruction cache, and a memory for managing the instruction cache based on temporal locality of cached instructions.

FIG. 2 is a block diagram of a system configuration 200 showing information flow between a processor 108, an instruction cache 110, and a memory 120 for managing the instruction cache based on temporal locality of cached instructions. At 205, the processor 108 fetches the first instruction for execution. At 210, the instruction cache 110 determines that the first instruction is not stored in the cache.

At 215, the instruction cache 110 fetches the first instruction and the associated temporal attributes from the memory 120. At 220, the instruction cache 110 stores the first instruction in the associated temporal attributes. At 225, the instruction cache 110 returns the first instruction to the processor 108.

At 230, the processor 108 fetches a second instruction for execution. At 235, the instruction cache 110 determines that the second instruction is not stored in the cache. At 240, the instruction cache 110 fetches the second instruction and associated temporal attributes from the memory 120. At 245, the instruction cache 110 determines that it is full.

At 250, the instruction cache 110 evicts the first instruction based on the associated temporal attributes. For example, the instruction cache 110 may determine that the second instruction is more likely to be re-fetched by the processor 108 than the first instruction, and in response may evict the first instruction. This determination may be performed as described above with reference to FIG. 1. At 255, the instruction cache 110 stores the second instruction any associated temporal attributes in the cache. At 260, the instruction cache 110 returns the second instruction to the processor 108.

FIG. 3A is a block diagram showing an example state 300 of an instruction cache 302 before an eviction decision based on temporal locality. As shown, the instruction cache 302 includes temporal instructions 302a-c, and non-temporal instruction 306. A new temporal instruction 308 is to be stored in the instruction cache 302.

FIG. 3B is a block diagram showing an example state 350 of the instruction cache 302 after the eviction decision based on temporal locality. The instruction cache 302 still includes the temporal instructions 302a-c. The non-temporal instruction 306 has been evicted from the instruction cache 302, and replaced with the new temporal instruction 308.

Figure 4A:
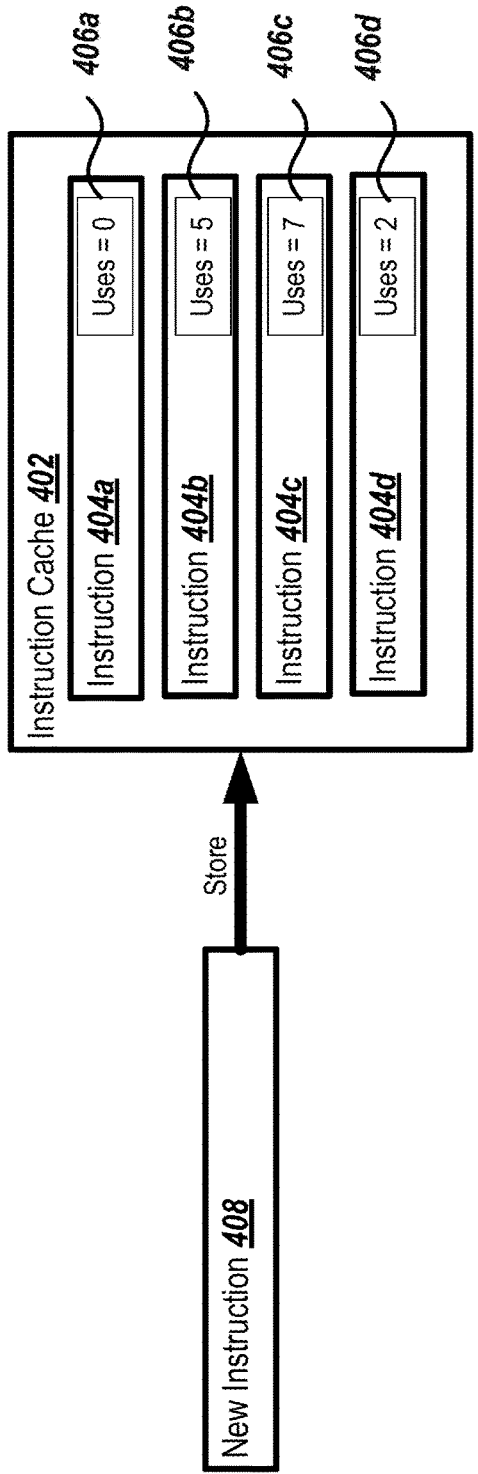
FIG. 4A is a block diagram showing an example state of an instruction cache before an eviction decision based on observed entry usage.

FIG. 4A is a block diagram showing an example state 400 of an instruction cache 402 before an eviction decision based on observed entry usage. As shown, the instruction cache 402 includes instructions 404a-d. Each of the instructions 404a-d includes a re-use count 406a-d. In some implementations, the instruction cache 402 may increment the re-use counts 406a-d when each instruction is fetched from the cache 402. A new instruction 408 is to be stored in the instruction cache 402.

Figure 4B:
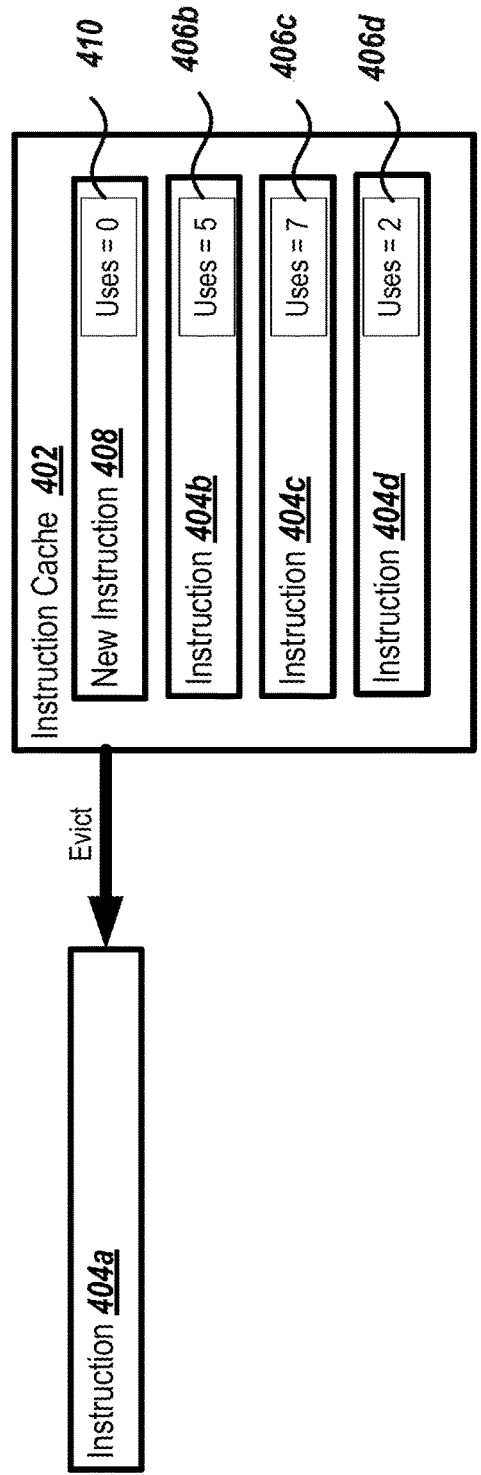
FIG. 4B is a block diagram showing an example state of an instruction cache after an eviction decision based on observed entry usage.

FIG. 4B is a block diagram showing an example state 450 of an instruction cache 402 after the eviction decision based on observed entry usage. The instruction cache 402 still includes the instructions 404b-d. The instruction 404a has been evicted from the instruction cache 402 in favor of the new instruction 408. The re-use count 410 has been associated with the new instruction 408 and initialized to zero. In some cases, the instruction cache 402 may evict instructions that have a zero re-use count, indicating that they are non-temporal. The instruction cache 402 may also evict the instruction with the lowest re-use count currently stored in the instruction cache 402. In some cases, the instructions cache 402 may evict an instruction that has a zero re-use count even if the instruction is the most recently used instruction in the cache. For example, if the other cache entries have considerably higher re-use counts than the instruction to be evicted, and the instruction that will replace the instruction to be evicted is indicated as temporal, the instruction may be evicted even if it is most recently used instruction in the cache.

Figure 5:
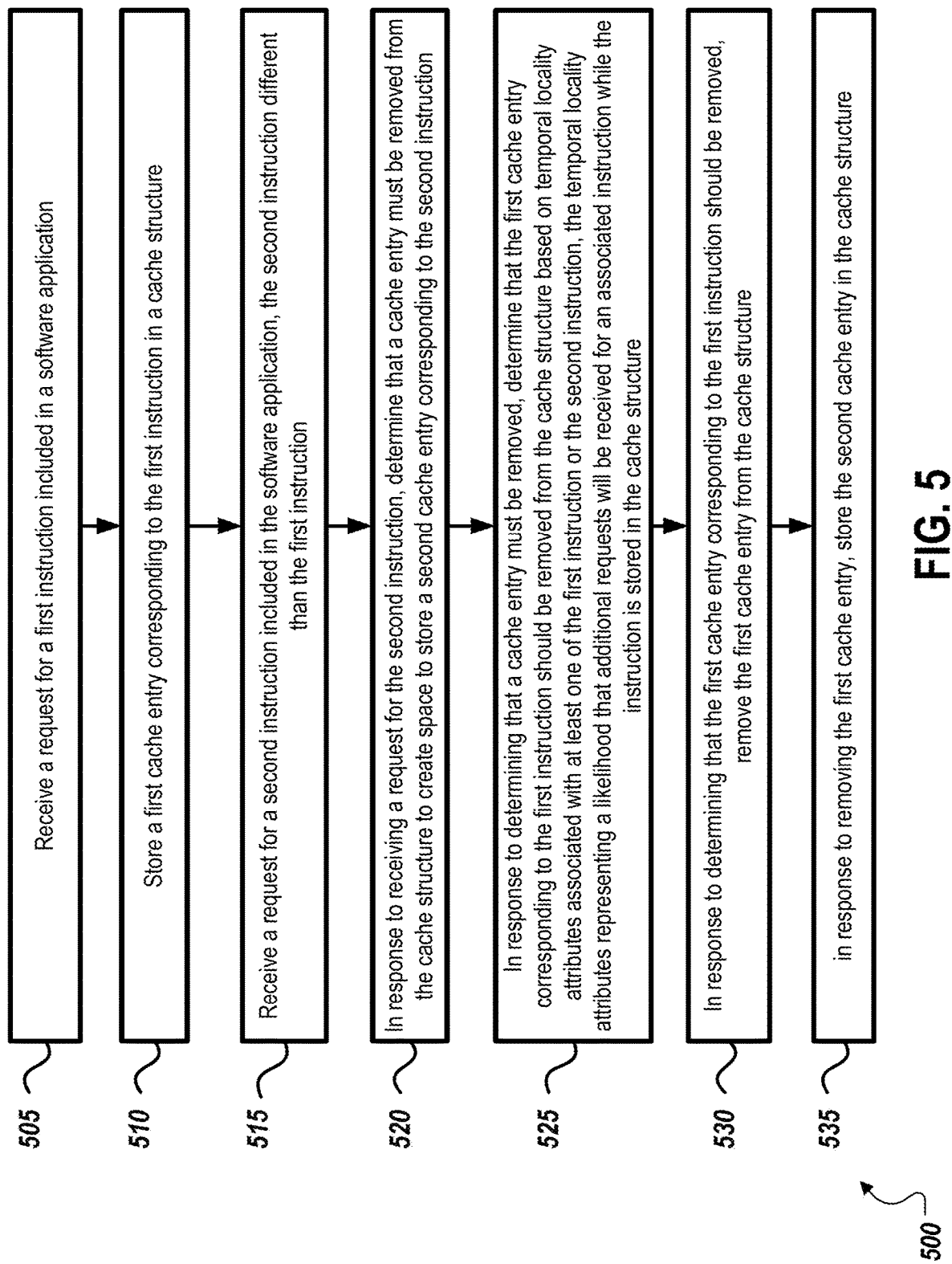
FIG. 5 is a flow diagram of an example process for managing an instruction cache based on temporal locality of cached instructions.

FIG. 5 is a flow diagram of an example process 500 for managing an instruction cache based on temporal locality of cached instructions. At 505, a request is received for a first instruction included in a software application.

At 510, a first cache entry corresponding to the first instruction is stored in a cache structure. In some cases, storing the first cache entry includes storing the first cache entry in the cache structure at a particular priority level based on the temporal locality attributes, and a determination that the first cache entry should be removed is based at least in part on the particular priority level. In some implementations, the first cache entry includes a temporal flag indicating whether the first cache entry is likely to be accessed, and the value of the temporal flag of the first cache entry is set based on the temporal locality attributes, and a determination that the first cache entry should be removed is based at least in part on the value of the temporal flag.

At 515, a request for a second instruction included in the software application is received, the second instruction being different than the first instruction. At 520, in response to receiving a request for the first instruction, a determination is made that a cache entry must be removed from the cache structure to create space to store a second cache entry corresponding to the second instruction.

At 525, in response to determining the cache entry must be removed, a determination is made, such as by the cache structure or a cache controller associated with the cache structure, that the first cache entry corresponding to the first instruction should be removed from the cache structure based on temporal locality attributes associated with at least one of the first instruction or the second instruction. In some cases, the temporal locality attributes represent a likelihood the additional requests will be received for an associated instruction while the associated instruction in stored in the cache. In some implementations, the first cache entry includes a use flag indicating whether the first cache entry has been re-accessed within the cache, the determination that the first cache entry should be removed is based at least in part on the use flag. In some cases, the temporal locality attributes include historical execution data for the software application. The temporal locality attributes may include a temporal indicator indicating whether additional requests for the associated instruction are likely or unlikely to be received. In some cases, the temporal locality attributes are associated with a particular instruction region including one or more instructions, and represent a likelihood that additional requests will be received for instructions included in the instruction region. In some cases, the temporal locality attributes are determined at least partly during execution of the software application. The temporal locality attributes may also be determined based at least in part on branch prediction results for the software application.

At 530, in response to determining that the first cache entry corresponding to the first instruction should be removed, the first cache entry is removed from the cache structure. At 535, in response to removing the first cache entry, the second cache entry is stored in the cache structure.

Figure 6:
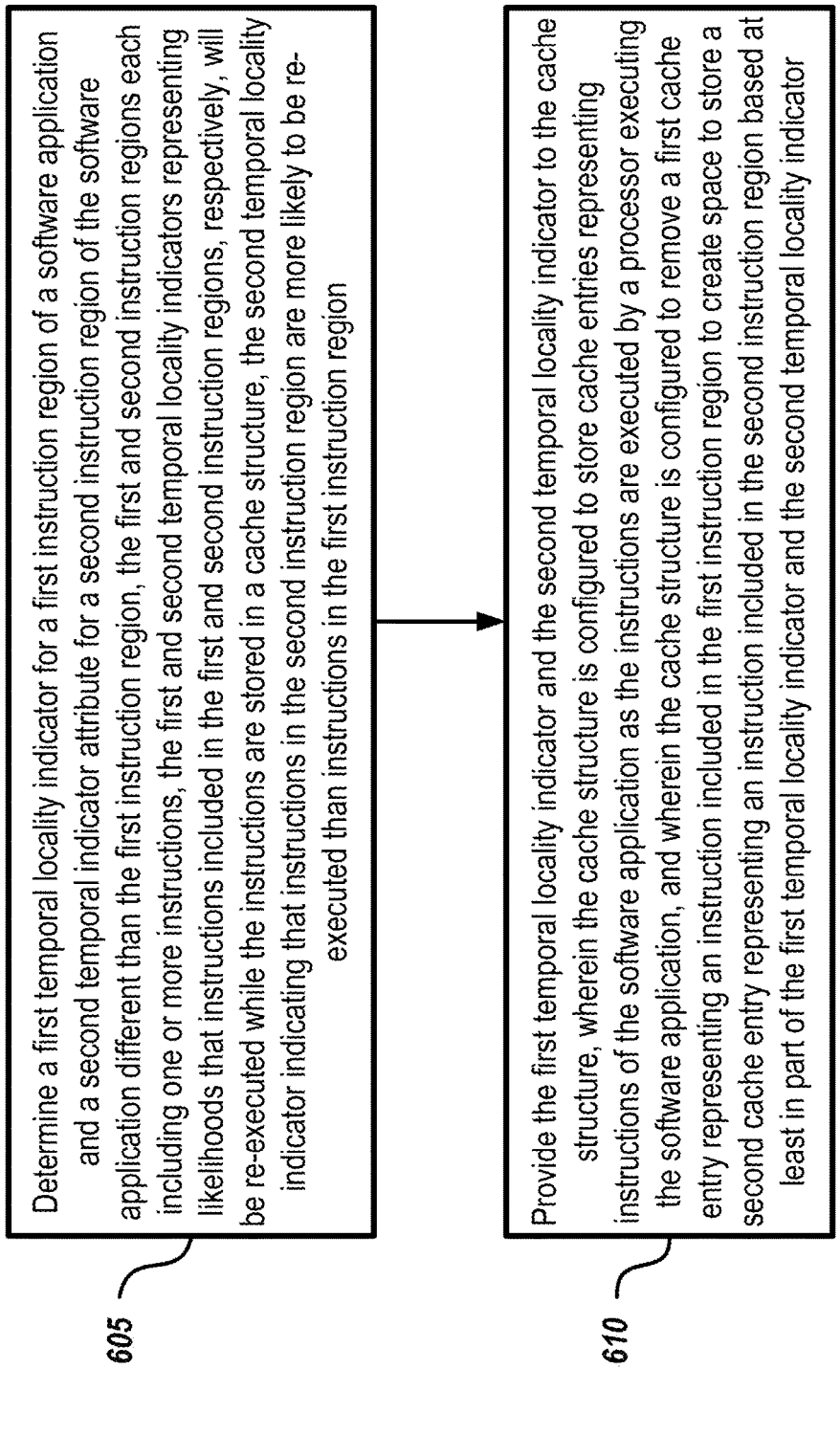
FIG. 6 is a flow diagram of an example process for determining temporal locality attributes for a software application.

FIG. 6 is a flow diagram of an example process 600 for determining temporal locality attributes for a software application. At 605, a first temporal locality indicator is determined for a first instruction region of a software application and a second temporal locality indicator determined for a second instruction region of the software application. The first and second instruction regions are different instruction regions. In some cases, the first and second temporal locality indicators represent likelihoods that instructions included in the first and second instruction regions will be re-executed while the instructions are stored in a cache structure. In this example, assume the second temporal locality indicator indicates that instructions in the second instruction region are more likely to be re-executed than the instructions in the first instruction region.

The determinations of the temporal locality indicators can be done in a variety of appropriate ways. For example, in some cases, the determinations of the first and second temporal locality indicators are based at least in part on historical execution data for the software application. The determinations may also be based at least in part on branch prediction analysis of the software application. In still other implementations, the determinations may include monitoring usage of instructions in the first instruction region and the second instruction region during execution of the software application, and updating the first and second temporal locality indicators based on the monitored usage. The determinations may also include marking the first instruction region as non-temporal and the second instruction region as temporal. In some cases, the determinations include marking the first and second instruction regions with numerical values represent the likelihoods that instructions included in the first and second instruction regions will be re-executed while the instructions are stored in the cache structure, wherein the numerical value marking with the second instruction region is greater than the numerical value marking the first instruction region.

At 610, the first temporal locality indicator and the second temporal locality indicator are provided to the cache structure. The cache structure may be configured to store cache entries representing instructions of the software application as the instructions are executed by a processor executing the software application. The cache structure removes a first cache entry representing an instruction included in the first instruction region to create space to store a second cache entry representing instruction included in the second instruction region based on the first temporal locality indicator and the second temporal locality indicator indicating instructions from the second instruction region are more likely to be re-executed than the instructions in the first instruction region.

Figure 7:
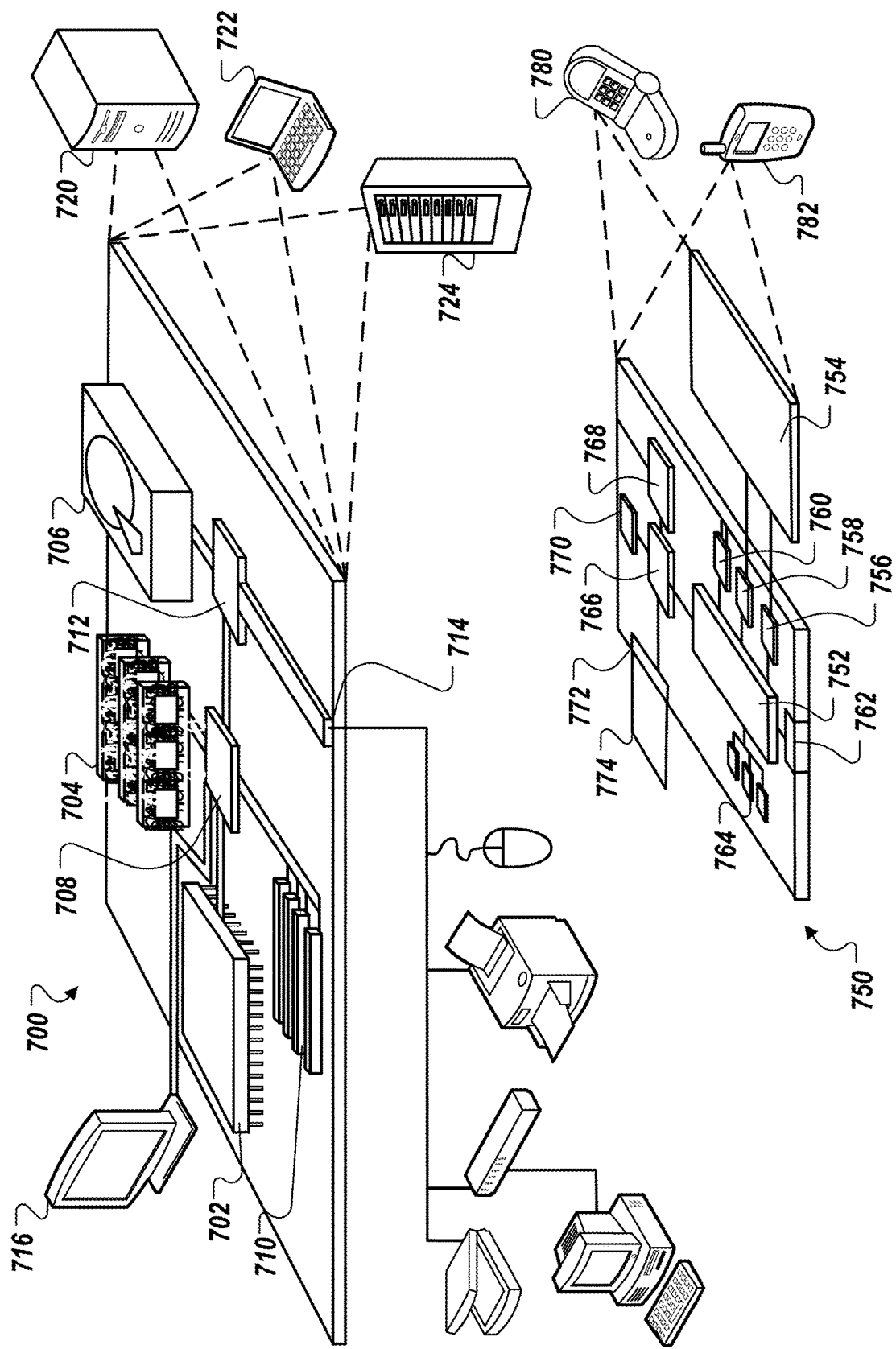
FIG. 7 is a block diagram of an example computing device.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed interface 708 manages bandwidth-intensive operations for the computing device 700, while the low speed interface 712 manages lower bandwidth-intensive operations. Such allocation of functions is exemplary only. In one implementation, the high-speed interface 708 is coupled to memory 704, display 716 (e.g., through a graphics processor or accelerator), and to high-speed expansion ports 710, which may accept various expansion cards (not shown). In the implementation, low-speed interface 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory 764 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a filesystem. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   determining that an instruction in a software application indicates that instructions subsequent to the instruction are temporal instructions;
   in response to determining that the instruction in the software application indicates that subsequent instructions are temporal instructions, determining whether the instruction occurred during a nested function call;
   in response to determining that the instruction occurred during a nested function call, determining to store future cache entries as non-temporal cache entries instead of temporal cache entries; and
   storing a cache entry for an instruction subsequent to the instruction as a non-temporal cache entry instead of a temporal cache entry.

2. The method of claim 1, wherein determining that an instruction in a software application indicates that instructions subsequent to the instruction are temporal instructions comprises:
   determining that the instruction comprises an explicit region end instruction that indicates subsequent instructions are subject to a normal caching policy.

3. The method of claim 1, wherein in response to determining that the instruction in the software application indicates that subsequent instructions are temporal instructions, determining whether the instruction occurred during a nested function call comprises:
   in response to determining that the instruction in the software application indicates that subsequent instructions are temporal instructions, decrementing an internal counter;
   determining that the internal counter satisfies a criteria after being decremented; and
   in response to determining that the internal counter satisfies the criteria after being decremented, determining that the instruction occurred during a nested function call.

4. The method of claim 3, wherein the criteria comprises the internal counter being non-zero.

5. The method of claim 3, comprising:
   in response to determining that a second instruction in the software application indicates that subsequent instructions are non-temporal instructions, incrementing the internal counter.

6. The method of claim 3, comprising:
   context switching the internal counter, wherein the internal counter is process-specific.

7. The method of claim 1, wherein in response to determining that the instruction occurred during a nested function call, determining to store future cache entries as non-temporal cache entries instead of temporal cache entries comprises:
   determining to store future cache entries not subject to a normal caching policy.

8. The method of claim 1, wherein storing a cache entry for an instruction subsequent to the instruction as a non-temporal cache entry instead of a temporal cache entry comprises:
   storing the cache entry with an indication that the cache entry is non-temporal.

9. A system comprising:
   one or more computers and one or more storage devices storing instructions that are operable, when executed by the one or more computers, to cause the one or more computers to perform operations comprising:
   determining that an instruction in a software application indicates that instructions subsequent to the instruction are temporal instructions;
   in response to determining that the instruction in the software application indicates that subsequent instructions are temporal instructions, determining whether the instruction occurred during a nested function call;
   in response to determining that the instruction occurred during a nested function call, determining to store future cache entries as non-temporal cache entries instead of temporal cache entries; and
   storing a cache entry for an instruction subsequent to the instruction as a non-temporal cache entry instead of a temporal cache entry.

10. The system of claim 9, wherein determining that an instruction in a software application indicates that instructions subsequent to the instruction are temporal instructions comprises:
    determining that the instruction comprises an explicit region end instruction that indicates subsequent instructions are subject to a normal caching policy.

11. The system of claim 9, wherein in response to determining that the instruction in the software application indicates that subsequent instructions are temporal instructions, determining whether the instruction occurred during a nested function call comprises:
    in response to determining that the instruction in the software application indicates that subsequent instructions are temporal instructions, decrementing an internal counter;
    determining that the internal counter satisfies a criteria after being decremented; and in response to determining that the internal counter satisfies the criteria after being decremented, determining that the instruction occurred during a nested function call.

12. The system of claim 11, wherein the criteria comprises the internal counter being non-zero.

13. The system of claim 11, comprising:
in response to determining that a second instruction in the software application indicates that subsequent instructions are non-temporal instructions, incrementing the internal counter.

14. The system of claim 11, comprising:
context switching the internal counter, wherein the internal counter is process-specific.

15. The system of claim 9, wherein in response to determining that the instruction occurred during a nested function call, determining to store future cache entries as non-temporal cache entries instead of temporal cache entries comprises:
determining to store future cache entries not subject to a normal caching policy.

16. The system of claim 9, wherein storing a cache entry for an instruction subsequent to the instruction as a non-temporal cache entry instead of a temporal cache entry comprises:
storing the cache entry with an indication that the cache entry is non-temporal.

17. A non-transitory computer-readable medium storing software comprising instructions executable by one or more computers which, upon such execution, cause the one or more computers to perform operations comprising:
determining that an instruction in a software application indicates that instructions subsequent to the instruction are temporal instructions;
in response to determining that the instruction in the software application indicates that subsequent instructions are temporal instructions, determining whether the instruction occurred during a nested function call;
in response to determining that the instruction occurred during a nested function call, determining to store future cache entries as non-temporal cache entries instead of temporal cache entries; and
storing a cache entry for an instruction subsequent to the instruction as a non-temporal cache entry instead of a temporal cache entry.

18. The medium of claim 17, wherein determining that an instruction in a software application indicates that instructions subsequent to the instruction are temporal instructions comprises:
determining that the instruction comprises an explicit region end instruction that indicates subsequent instructions are subject to a normal caching policy.

19. The medium of claim 17, wherein in response to determining that the instruction in the software application indicates that subsequent instructions are temporal instructions, determining whether the instruction occurred during a nested function call comprises:
in response to determining that the instruction in the software application indicates that subsequent instructions are temporal instructions, decrementing an internal counter;
determining that the internal counter satisfies a criteria after being decremented; and
in response to determining that the internal counter satisfies the criteria after being decremented, determining that the instruction occurred during a nested function call.

20. The medium of claim 19, wherein the criteria comprises the internal counter being non-zero.

* * * * *